June 19, 1951     C. M. RIFENBERGH     2,557,393
ELECTRICAL TORQUE MEASURING SYSTEM
Filed Dec. 22, 1943     2 Sheets-Sheet 1
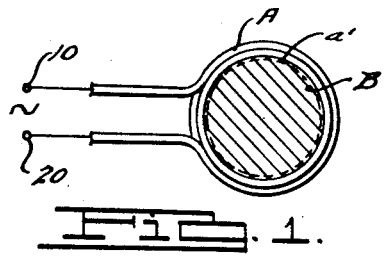
Fig. 1.
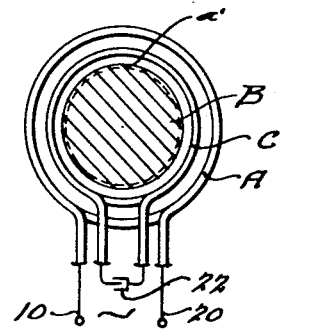
Fig. 2.
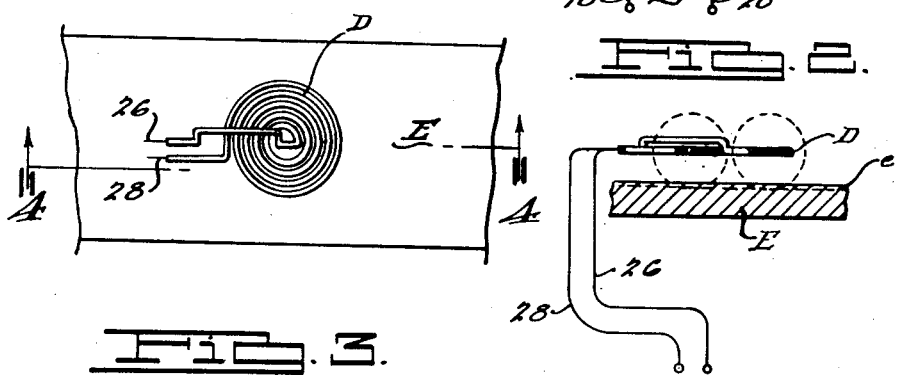
Fig. 3.
Fig. 4.
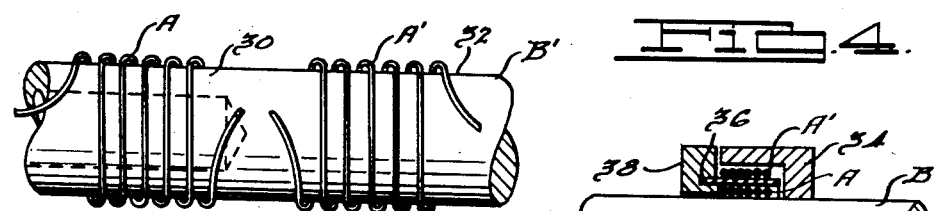
Fig. 5.
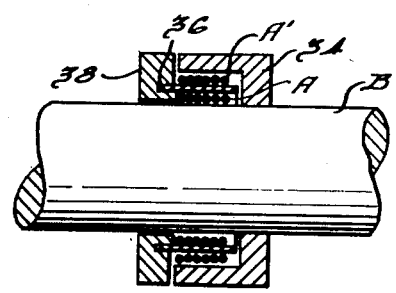
Fig. 6.
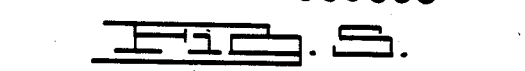
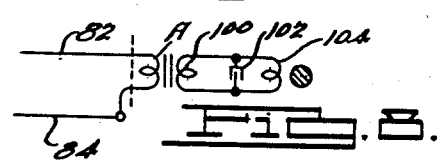
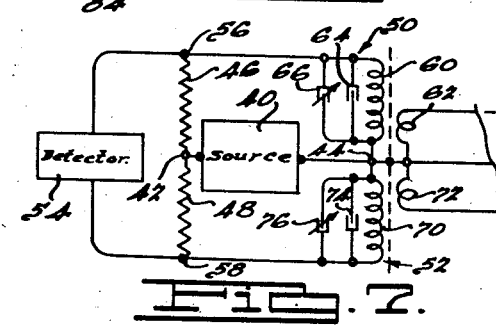
Fig. 7.
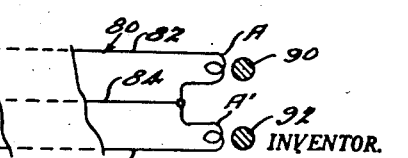
INVENTOR.
Clare M. Rifenbergh
BY Harness, Dickey & Pierce
ATTORNEYS.

June 19, 1951
C. M. RIFENBERGH
2,557,393
ELECTRICAL TORQUE MEASURING SYSTEM
Filed Dec. 22, 1943
2 Sheets-Sheet 2
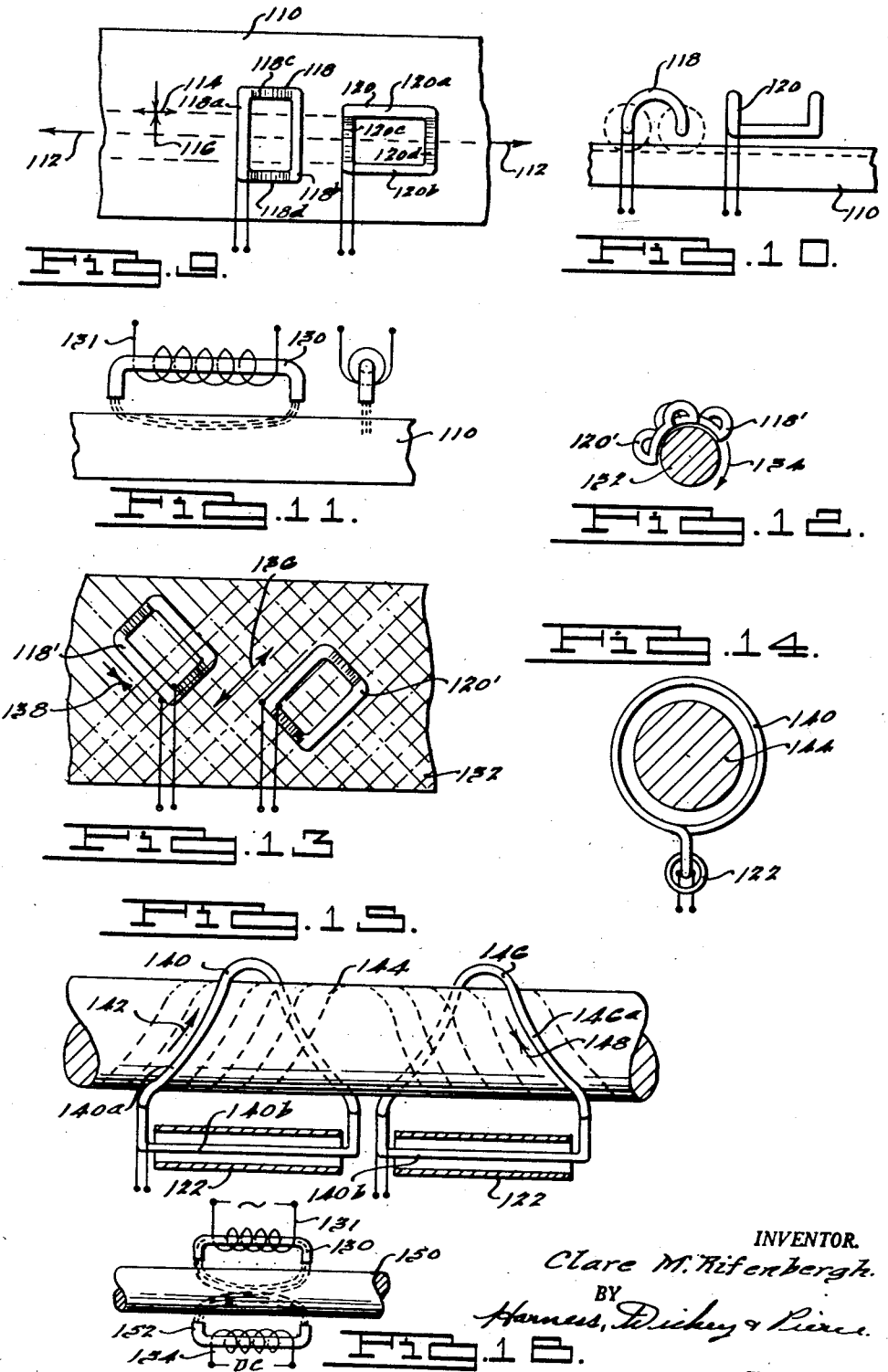
INVENTOR.
Clare M. Rifenbergh.
BY
Harness, Dickey & Pierce
ATTORNEYS.

Patented June 19, 1951

2,557,393

UNITED STATES PATENT OFFICE 2,557,393

ELECTRICAL TORQUE MEASURING SYSTEM

Clare Morgan Rifenbergh, Port Huron, Mich.

Application December 22, 1943, Serial No. 515,277

11 Claims. (Cl. 73—13.6)

The present invention relates to methods of and apparatus for ascertaining a physical or operating characteristic of a member by the use of elements which respond to the degree the member is stressed. The term "ascertaining" is used herein in a generic sense as including, but not by way of limitation, providing a measure, indication or record of, or a control or other operation in response to, the characteristic in question. In certain of its aspects the present invention is directed to improvements upon the invention disclosed and claimed in applicant's copending application Serial No. 358,742, filed September 27, 1940, now Patent No. 2,457,727.

The principal objects of the present invention are to provide arrangements, as aforesaid, which may be characterized in that a member, at least a portion whereof has properties such that the effect thereof upon a magnetic field, or the effect thereon of such magnetic field, depends upon the degree to which such member is stressed, is disposed within such a magnetic field, and such effect is utilized to ascertain a characteristic of the member; to provide such arrangements wherein such field is produced by the application to an impedance element of an alternating potential having a frequency above the audible range and variations in the stressed condition of the member are reflected as changes in the impedance of the element; to provide such arrangements wherein the member is provided with a surface layer having suitable stress-reactive characteristics and wherein the electromagnetic field is largely confined to such layer; to provide improved arrangements for orienting one or more said elements relative to the fibre stress orientations in the member, so as to segregate tensile and compressive stress effects; to provide such arrangements embodying the improved feature of magnetically preloading the stressed member; and to provide such arrangements embodying pickup elements located in proximity to the member to be studied, response elements located remotely therefrom, and means including a transmission line for coupling these elements together, the response elements preferably including an electrical bridge, and the pickup elements embodying impedance means which is affected by the stress-reactive characteristics of the member to be studied.

Other and more detailed objects of the present invention, in respect to the improved method and in respect to apparatus for practicing it, appear in the following description and in the appended claims. In the drawings, which represent illustrative embodiments of the invention:

Figure 1 is an elementary diagram illustrative of the invention;

Fig. 2 is an elementary diagram illustrative of a modification of the invention;

Figs. 3 and 4 are elementary diagrams of a further modification, Fig. 4 being taken along the line 4—4 of Fig. 3;

Figs. 5 and 6, respectively, are elementary diagrams of further modifications of the invention;

Fig. 7 is a diagrammatic illustration of a system embodying the invention;

Fig. 8 is a fragmentary view showing a further modification of the invention;

Figs. 9 and 10 are, respectively, plan and elevational views of a modification of the invention;

Fig. 11 is a fragmentary view in elevation of a further modification of the invention;

Figs. 12 and 13 are, respectively, views in transverse vertical section and in plan of a further modification of the invention;

Figs. 14 and 15 are, respectively, views in vertical section and in side elevation of a further modification of the invention; and Fig. 16 is a diagrammatic view of an additional modification.

It will be appreciated from a complete understanding of the present invention that, in a generic sense, the improvements thereof may be embodied in various different methods and apparatus, arranged to ascertain any one or more of a wide variety of characteristics of members to be studied. An illustrative application of the invention is in connection with the continuous or intermittent measurement of the torque output of aircraft engines. There is now and has been for some time past a decided need for measuring equipment of the just-mentioned type, arranged either to provide an indication of, or a control operation in response to, the torque outputs of individual aircraft engines, and considerable research effort has been devoted to this problem.

The above-identified copending application Serial No. 358,742 discloses and claims a generic combination which is preferably utilized in the practice of the present invention, although the improved pickup elements of the present invention are not necessarily limited in their use to such combination. In a now preferred embodiment, this broad combination comprises a Wheatstone bridge circuit having a pair of reactive arms which are differentially coupled to output terminals and which is excited with alternating current of a frequency above the audible range; that is to say, a frequency in excess of 50,000 cycles. Frequencies above 200 kilocycles are preferred, a frequency in the region of 400 kilocycles having been found very satisfactory. The output terminals are suitably coupled by well known means to indicating instruments or other apparatus. At least one of the aforesaid reactive arms has coupled to it, preferably through a low impedance transmission line, a pickup element which is located at the engine shaft with which the apparatus is associated. Both arms preferably have a high ratio of reactance to resistance at the operating frequency, and are tuned to the neighborhood of resonance, so that exceedingly small changes of impedance of the pickup elements are reflected as relatively large unbalance voltages across the output terminals. The impedance changes which it is desired to measure may be expected to be small in comparison to parasitic influences in the region traversed by the transmission line and, consequently, it is of particular importance that the transmission line be of relatively low impedance so as to minimize the effect of these parasitic influences. The present invention is concerned primarily with the aforesaid pickup elements, that is to say, with the provision of improved methods and apparatus for producing a usable impedance change in response to a characteristic of a member (such as the torque transmitted through the drive shaft of an airplane engine).

It is known that the application of mechanical stresses to various materials, notably ferromagnetic materials, changes the magnetic properties thereof. It is also known that such stresses alter the electrical resistance of various materials. The change in magnetic properties is commonly considered as being due to the phenomenon of magnetostriction and has heretofore been proposed as a means to convert mechanical effects into magnetic effects. An example of this practice is afforded by the patent to Buckley No. 1,666,680, in which the change in permeability of a ferromagnetic member, produced by a change in its mechanically stressed condition, is reflected as a change in impedance of an associated coil having a field which penetrates the member.

So far as the present applicant is aware magnetostrictive stress measuring systems have been limited to coil excitation frequencies in the audible range. Due to the low frequencies hitherto used, the impedances involved have been physically large, heavy and cumbersome and have, in all cases known, required coil structures possessing a very large number (15,000 to 35,000) turns of very fine wire. Such constructions are impractical for use with aircraft engine shafts of modern design which are commonly found to be from 4 to 7 inches in diameter, thus requiring a coil, for the low frequency system, of definitely impractical size, weight, and general applicability to the engine structure. One of the very notable features of the present invention resides in the fact that the responsive impedance elements are of but a few turns of small wire and this invention thus provides the use of impedance elements which are very small, light and compact and of very simple construction, which are easily adapted to placement in the structures of present designs of aircraft engines without requiring any unreasonable modification of the engine design.

In accordance with the present invention, it has been discovered that changes, of usable magnitude, in the impedance of a coil, excited at a frequency above the audible range, can be produced by changes in the mechanically stressed condition of a member which is pentrated by the field of such coil. The impedance changes may be due in part to magnetostrictive effects, but it appears that they are predominantly due to changes in high-frequency resistance of the member, which latter changes alter the resistance to flow of currents induced in the member by the measuring coil. It is, therefore, preferred to characterize the present high-frequency system as being an elasto-resistive system as distinguished from the magnetostrictive systems.

Referring particularly to Fig. 1, a coil A, which is preferably helically wound, is disposed about a member B, which may, for example, be the output shaft of an airplane engine. Suitable supporting means (not shown) may be provided so as to stationarily support the coil in, preferably, substantially concentric relation to the shaft B, so that, in operation, the shaft B rotates within the coil A. The terminals 10 and 20 of coil A may be connected to a suitable high-frequency excitation source.

As will be understood, the flow of current through coil A establishes a magnetic field within which the shaft B is located. It will be further understood that the density of this magnetic field and the degree to which it penetrates the body of the shaft B will depend upon a number of factors, such as the type of material of which shaft B is composed, the ampere turns of coil A and the frequency of the exciting source. At high frequencies and with most magnetic materials, it appears that that part of the field which exists within coil A is largely confined to a relatively thin surface layer of shaft B, the field being very dense within such layer and being of almost negligible density at points spaced radially inwardly from the layer.

It will be understood that if the shaft B is loaded, either in tension or in compression, or torsionally, the fibers of the shaft will be stressed, it being noted that in the case of a torsional load, the fibers comprising the aforesaid outer layer will be subjected to the greatest amount of stress. As aforesaid, it has been found that variations in the degree to which shaft B is loaded produce corresponding variations in the impedance of coil A, and, in accordance with the present invention, these changes in impedance are transferred to the co-operating response elements so as to produce a measure of the load in question. It is believed, as aforesaid, that these changes in impedance are at least predominantly due to changes in the magnitude of currents induced in shaft B by the field of coil A, which current changes are due to the variation in the high-frequency resistance of shaft B. As affording one possible explanation, it may be expected that the currents flowing in the exciting coil A will produce eddy currents within that part of the body of shaft B which is penetrated by the field and the magnitude of these eddy currents (and their consequent reactive effect upon coil A) may be governed by the degree to which the fibers are stressed. On the other hand, in view of the fact that the field appears to be concentrated in a surface layer of shaft B, such layer may be regarded as a single turn secondary winding of a transformer, the primary winding whereof is constituted by winding A. Viewed in this way, the stresses in the fibers of shaft B may govern the resistance of this single turn secondary winding.

In the modified arrangement of Fig. 2, a pair of coils A and C are inductively coupled together through a magnetic circuit which includes the shaft B. As before, the terminals 10 and 20 of coil A are disposed for connection to the high-frequency exciting source and the terminals of coil C are connected together through a condenser 22. Coil C may be arranged to rotate with shaft B, but is preferably supported so that it is stationary with respect to coil A. It will be understood that the assembly comprising coils A and C and shaft B has, at a given frequency, and at a given coupling coefficient as determined by shaft B, a given impedance. Preferably, the proportioning of coils A and C and condenser 22 is such that under these conditions the circuit is in the neighborhood of resonance, thereby affording a maximum flow of current through coil A and a consequent maximum field density. As in the case of Fig. 1, variations in the degree to which shaft B is stressed are found to alter its characteristics in such a way as to alter the impedance of the circuit comprising coils A and C.

The arrangement of Figs. 3 and 4 is illustrative of the application of the invention to members other than shafts. In these figures, a coil D of spiral form is connected through leads 26 and 28 to a source of high-frequency alternating current. A member E, the stressed characteristics of which are to be ascertained, is disposed so that at least a part of the magnetic field of coil D penetrates it. As shown, coil D is disposed flatwise upon or immediately adjacent the surface of member E. In this case, it may be expected that the field penetration will be confined to a very thin layer $e$ of member E. If now member E is stressed in tension, compression or otherwise, a resulting change in impedance of coil D is produced.

In many cases it may be expected that the pickup element will be located in an area in which it is subjected to relatively wide changes in temperature and to other physical influences, such as intensive vibration and the like. In such instances, in order to minimize the effect of these environmental changes, it has been found desirable to use two identical or similar stress-reactive elements such as any of those shown in Figs. 1, 2, and 3, balanced against each other. Such an arrangement is shown in Fig. 5, wherein two coils A and A' are disposed about a shaft B'. Coil A is located adjacent a shaft part 30, which has physical characteristics which differ from those of shaft part 32, with which coil A' is associated. For example, these different physical characteristics may be imparted to the shaft by making the portion 30 tubular in form. With this arrangement, it will be understood that while coils A and A' will be subjected to substantially identical influence so far as temperature, vibration and the like, are concerned, the strains caused by the transmission of a load through shaft B' will be greater in the case of portion 30 than in the case of portion 32. Consequently, such load will produce a greater change of impedance of coil A than of coil A'. As described in connection with Fig. 7, coils A and A' may be differentially coupled to the response units so that the latter measures the difference in impedances between coils A and A'.

A modified arrangement for utilizing two differentially related pickup elements is shown in Fig. 6, in which the coil A is magnetically related to a stressed part of shaft B and coil A' is magnetically related to an unstressed member 34, which is fixed to and rotates with shaft B. Suitable electrostatic and electromagnetic shielding between coils A and A' is illustrated as being provided by the annular shielding member 36. As will be understood, member 36, as well as coils A and A', are stationarily carried by an annular supporting member 38. By virtue of the electrostatic and electromagnetic shielding provided between them, no coupling exists between coils A and A'. Also, while shaft B is penetrated by the field of coil A in the manner described in connection with the preceding figures, it is not penetrated by the field of coil A'. On the other hand, while the unstressed annular member 34, which may also be stationary or may rotate freely with shaft B, is penetrated by the field of coil A', it is not penetrated by the field of coil A. By virtue of the proximity of coils A and A' to each other, and to member 34 and the penetrated part of shaft B, it will be observed that temperature and other environmental changes affect the impedances of coils A and A' in substantially identical degrees. On the other hand, while coil A' is unaffected by changes in the loading of shaft B, the impedance of coil A is determined thereby in the manner previously described.

Before proceeding to a description of Figs. 7 and 8, it is to be noted that within the broader aspects of the invention the aforesaid stressed members may be formed of any of a wide variety of materials, either ferromagnetic or non-ferromagnetic. The essential characteristic of the material to be studied is that changes in the degree to which the material is stressed be reflected as a change in impedance of an associated element within the magnetic field whereof the member is disposed. In a more limited sense, it is preferred, of course, to have that part of the member which is penetrated by the field be composed of material which is relatively highly stress-reactive. In many cases, the material being studied is itself sufficiently highly stress-reactive to provide usable changes in impedance within the range of loadings provided in service. In cases where the material itself is not sufficiently stress-reactive, a further feature of the present invention resides in adding to the member a stress-reactive layer within which the field penetration is largely, if not entirely, confined. This feature, in a generic sense, is useful in both magnetostrictive and elasto-resistive systems.

At the preferred frequencies (or the order of 400 kilocycles) it is usually found that the effective field penetration is of the order of five one-thousandths of an inch, and, consequently, in such cases a stress-reactive layer of approximately such thickness is sufficient. The stress-reactive layer, indicated to an exaggerated degree at $a'$ in Figs. 1 and 2 and at $e$ in Fig. 4, may be applied in various ways. For example, this layer may be applied as a securely bonded integral coating by plating or spraying operations which are well known. Nickel or nickel iron alloy has been found to be suitable. Such material may be sprayed upon the surface of the member and then subjected to induction heat treatment to cause the sprayed material to melt or flow to form a homogeneous, continuous and securely bonded film. Moreover, in order to minimize the penetration of the field into the body of the member itself, a thin film of nonmagnetic material, such as copper, may be interposed between the body of the material and stress-reactive layer.

Referring now to Fig. 7, a system which may be arranged to incorporate any of the above described pickup elements, but is specifically arranged to incorporate the pickup elements of Figs. 5 and 6 is shown as comprising a source of alternating current 40. Source 40 may comprise a conventional oscillator circuit having an output frequency, for example, of 400 kilocycles. The output terminals 42 and 44 of source 40 are connected to a balanced bridge of the Wheatstone type having a pair of resistive arms 46 and 48 and a pair of reactive arms 50 and 52. A suitable detector 54, which may, for example, comprise a measuring instrument or control elements disposed to control the operation of an associated engine, is connected across terminals 56 and 58, the potential wherebetween is at all times equal to the vectorial sum of the potentials across the reactive arms 50 and 52. The reactive arm 50 comprises coils 60, 62 and A and condensers 64 and 66. Reactive arm 52, in turn, comprises coils 70, 72 and A' and condensers 74 and 76. As previously mentioned, coils 62 and A and coils 72 and A' are conductively connected to each other by means of a three-wire low impedance transmission line 80, comprising conductors 82, 84 and 86, conductor 84 comprising a common return. As is indicated by the dashed portions of line 80, the pickup elements comprising coils A and A' may be located at a considerable distance from the remaining elements of the bridge.

Preferably, both reactive arms 50 and 52 are adjusted to the neighborhood of resonance to the frequence of the source 40. The coupling between coils 60 and 62, on the one hand, and coils 70 and 72, on the other hand, is preferably very close. The coils 60 and 62 may be wound on the same form, preferably a toroidal form of compressed powdered iron, and coils 70—72 may be similarly arranged. To avoid capacitive effects in these respective couplings, it is preferred to interpose Faraday screens between the coupled coils. On the other hand, it is preferred to avoid any coupling between the respective legs 50 and 52, as by the use of suitable shielding.

As aforesaid, it is preferred to so arrange the system that the individual legs 50 and 52 have a relatively high ratio of reactance to resistance, so as to increase the sensitivity of the system. At the same time, it is preferred that the individual coils 62 and 72 and A and A' be of relatively low impedance, each comprising, for example, four to twenty turns of wire more or less, depending upon the operating frequency and other normal considerations relating to the matching of impedances.

In Fig. 7 the coils A and A' are associated with shaft portions 90 and 92, which shaft portions may correspond, for example, to portions 30 and 32 of shaft B' (Fig. 5) or to portions B and 34 of Fig. 6. The mechanical relation between these coils and shaft elements is preferably such that a close coupling is afforded between coil A and shaft element 90 and between coil A' and equivalent shaft portion 92. On the other hand, intercoupling between these elements is preferably avoided, by the use of suitable shielding, as aforesaid.

With the above arrangement, it will be understood that under normal conditions (either an unloaded or a loaded condition) arms 50 and 52 have effective values of impedance which bear a predetermined proportionality to each other. The initial adjustments of the system are preferably such that these impedances are substantially equal so that under normal conditions a zero potential is applied to the detector circuit. If the loading of the associated shaft is varied, on the other hand, the impedance of coil A is correspondingly varied, which change is reflected as a change in the impedance of arm 50. This change alters the balance of the bridge and produces a change in the potential applied to the detector terminals.

It is to be noted, also, that while shaft elements 90 and 92 may be related as stressed and unstressed portions of the same shaft, they may also be associated with different shafts. In such event, the detector potential serves as a measure of the comparative loading of the two shafts.

In the embodiment shown in Fig. 8, the coil A, for example, is coupled through coil 100 to a tuned circuit comprising condenser 102 and coil 104. Coil 104 may be associated with the member to be studied in the previously described manner. In this instance, as will be understood, the circuit comprising elements A—100—102—104 may be tuned to the neighborhood of resonance with the supply frequency, elements 102, 104 and 100 being in parallel resonant relation, thereby affording maximum current flow through coil 104 and consequent maximum field density, with a minimum of current flow through the transmission line comprising elements 82 and 84.

Further features of the invention which, in a generic sense, are deemed useful in both magnetostrictive and elasto-resistive systems are illustrated in Figs. 9 through 13 and may be broadly characterized in that they provide for the orientation of the pickup or stress-responsive elements with respect to the fiber stress orientation in the stressed members.

In Figs. 9 and 10, a member 110 is illustrated as being subjected to a tensile force, represented by the arrows 112. It will be recognized that the application of the tensile force to member 110 subjects the fibers to both tensile and compressive stresses, the tensile stress being due to elongation of the material in a direction parallel to the applied force and the compressive stress being due to reduction of the material in a direction normal to the applied force. These tensile and compressive components are represented respectively by the arrows 114 and 116. With most materials, it appears that tensile and compressive forces produce respectively opposite changes of resistance and of magnetic permeability, tensile forces acting in general to increase resistance and, throughout a certain load range, to also increase permeability. Compressive forces, on the other hand, act in general to reduce resistance, and, throughout a predetermined load range, to reduce permeability.

In accordance with the present invention, it is proposed, as aforesaid, to orient the pickup mechanism with respect to the lines along which these components of stress act, and, in general, it is preferred to utilize separate pickup elements which are individual, respectively, to the respective components. So far as the present applicant is aware, this orientation is generically new in high-frequency or elasto-resistive systems and it is further new, in magneto-resistive systems, to utilize pickup elements which respond to several angularly displaced stress components.

In Figs. 9 and 10, two pickup coils 118 and 120 are utilized. The two coils sides 118a and 118b are disposed immediately adjacent the surface of the member, so that a part of the field which surrounds these sides penetrates the surface of the member 110. The remaining two coil sides 118c and 118d are arranged so that no substantial part of the associated field penetrates the member 110. In Figs. 9 and 10, this is illustrated as being accomplished by elevating these coil sides and, if desired, shielding members 122, as shown in Figs. 14 and 15, may also be used. The companion coil 120 is arranged at right angles to the coil 118, the coil sides 120a and 120b being magnetically cooperative with the member 110 and the sides 120c and 120d being magnetically isolated therefrom. With this disposition of the coils, it has been found that the coil 118 is predominantly responsive to permeability or resistive changes due to the compressive stress 116, while the coil 120 is predominantly responsive to permeability or resistive changes due to the tensile stress 114. The just-mentioned disposition of these coils, therefore, produces aggregate changes of impedance which are greater than would be produced in the absence of such segregation of the tensile and compressive effects. In addition, such disposition of the pickup elements provides an automatic and exact balancing out of temperature and other effects which may take place in other than a differential manner.

Generically speaking, a similar result may be achieved with the structure of Fig. 11, wherein the coil 131 is wound upon a core piece 130, which is disposed adjacent the member 110. Member 130 is oriented to predominantly respond to tensile stresses, and the coil 131 thus corresponds to the coil 120. It will be understood that a similar member may be arranged at right angles to the member 130, so as to respond predominantly to the compressive stresses.

As will be recognized, when a cylindrical member, such as a shaft, is torsionally stressed, tensile and compressive stress lines are produced which are normal to each other, and which are helically disposed relative to the axis of the shaft. This relation is illustrated in Figs. 12 and 13, in which Fig. 12 represents a transverse section through a shaft 132 and Fig. 13 represents a development of a part of the surface of the shaft 132. The torsional stress indicated by the arrow 134 in Fig. 12 produces a helically oriented tensile fiber stress indicated by line 136 and a similar helically oriented compressive stress indicated by line 138. In this case, the coils 118' and 120', which correspond to the previously described coils 118 and 120, are oriented, respectively, to the compressive and tensile fiber stress lines. These coils preferably duplicate the coils 118 and 120 with the exception that the magnetically active coil sides, instead of being straight, are curved to conform to the surface of the shaft 132.

The just-mentioned arrangement of Figs. 12 and 13 is particularly advantageous, from a mechanical standpoint, since no part of the pickup assembly is required to surround the shaft in question. In certain cases, however, it may be desirable to dispose the shaft within the pickup elements, which arrangement is illustrated in Figs. 14 and 15. In these figures, coil 140 is provided with a helically formed side 140a which, throughout its length, lies parallel to the tensile fiber stress line 142. The ends of the coil side 140a, which extends entirely around the shaft 144, are connected by a straight coil side 140b. To render this coil side magnetically inactive with respect to the shaft 144, it is spaced some little distance from the surface of the shaft and is provided with the previously mentioned magnetic shield 122. The companion coil 146 is similarly constructed, but is turned 90° relative to the coil 140, so that its helical coil side 146a lies parallel to and is predominantly responsive to the compressive fiber stresses represented by the element 148.

In further accordance with the present invention, it is proposed to arrange the response circuit so that the impedance changes produced by the respective tensile and compressive components act differentially with respect to each other. More particularly, it is proposed to accomplish this by, in the case of a system such as shown in Fig. 7, connecting the pairs of coils such as 118—120 so that they correspond to the coils A and A' of Fig. 7. With this relation, it will be understood that the bridge arms of Fig. 7 are initially adjusted so that when the member to be stressed is either unloaded or is subjected to a normal load, the impedances of coils 118 and 120, for example, produce a predetermined condition of balance or unbalance of the bridge. With this relation, a given change in the stressed condition of the member causes an increase in the impedance of one of the arms and a decrease in impedance of the other arm of the bridge.

It is to be particularly noted that the just-mentioned system, utilizing a pair of pickup elements, which respond to corresponding stress components, is directionally selective. That is to say, it not only produces a signal the magnitude and sense of which measures the degree to which a stressed condition departs from a normal condition, and the sense of such departure, but it also produces a signal which establishes the direction in which the member is being stressed. For example, in case of a loaded shaft, one of the coils, such as 118', responds to compressive components when the torque is being transmitted from the source of power through the shaft to the load, and responds to tensile components when the load is returning power to the source through the shaft. The reverse is true of the companion coil 120'. The direction in which the voltage across the output terminals 56—58 (Fig. 7) departs from normal therefore indicates the direction in which the load is being transmitted through the shaft.

Similar comments apply to other stressed members, such as the sheet 110 of Fig. 9. If this member is stressed in tension, as indicated by the arrows 112, an output signal of one direction is produced. If the same member is stressed in compression, a signal of opposite direction is produced.

It will be understood that in each of the disclosed instances the effect on the impedances of the pickup elements may be utilized to obtain independent measures of stress or may be utilized to afford a comparison between a sample of known characteristics and another sample. For example, assuming a master sample of known characteristics produces a balanced condition of the bridge, the degree to which a test sample causes an unbalance of the bridge may be taken as a measure of the stressed condition (produced, for example, by residual stresses) of the test sample.

As will be understood, the unit change in permeability or resistance of a member which is produced by a unit change in loading depends both on the degree to which the member is loaded and upon whether the loading is in tension or in compression. For certain materials, for example, the change in permeability or resistance is a substantially linear function of the changes in loading throughout a substantial range of tensile loads, but is a non-linear function of changes in compressive loading or of changes in tensile loading outside of this range. Inasmuch as it is a well known fact that the effects of a fixed and constant magnetic field is similar if not identical in its effect upon a body as is a proportionate amount of stress with respect to the reaction of the body upon an alternating magnetic field it is here proposed to supply the equivalent of a mechanical load upon a shaft or other body by providing a fixed magnetic field through said body of such strength as to cause the said body to act, with respect to the field-stress reaction, as if it were mechanically loaded although such may not necessarily be the actual case. It is possible to orient such a fixed preloading field so that the effects of mechanical loading will either add or subtract from the effect due to the magnetic preloading field, thereby providing a considerable degree of freedom in obtaining a linear or otherwise desirable stress-field reaction characteristic. This feature is illustrated in Fig. 16, in which a member, such as a shaft 150, is loaded in axial compression and is provided with a pickup element, such as elements 131 and 130 of Fig. 11. In this instance, in order to magnetically preload the shaft 150, it is provided with a core piece 152 and a D. C. exciting coil 154. In this instance, further, the excitation of coil 154 produces a magnetic preloading of the fibers of shaft 150, which opposes the externally or mechanically applied load. Depending upon the relative magnitudes and directions of the mechanically and magnetically applied forces, therefore, shaft 150 may be caused to react upon coil 131, as though it were subjected either to a net compressive or a net tensile load.

It should be understood that such magnetic preloading means may be arranged in a number of ways, for instance, to insure that the flux of the preloading field (which will be a D. C. or constant field and may be furnished by a suitably placed permanent magnet) is oriented so as to effect the A. C. field which is depended upon for the measurement of the stress-impedance reactions. It is in fact possible, by well known means, to provide the A. C. impedance coil with superimposed D. C. current and by adjusting the value of the D. C. current therein, produce an effect equivalent to that produced by the two separate coils described. A number of arrangements to accomplish the same purpose are obviously possible by the use of permanent magnet elements to furnish the D. C. or constant-value preloading field.

Although only several specific embodiments of the invention have been described in detail, it will be appreciated that various modifications in the form, number and arrangement of parts may be made without departing from the spirit and scope of the invention.

What is claimed is:

1. The method of ascertaining a characteristic of a shaft-like member subjected to a torsional stress producing both tensile and compressive components of stress therein, comprising producing a pair of magnetic fields, locating said magnetic fields adjacent a surface portion of the said member so that a flux penetration into said surface portion is produced by each of said magnetic fields, further locating said magnetic fields relative to said member to respectively align the paths of said flux penetrations through the said member with the tensile and compressive components of the said stress applied to the member, detecting the variations in said magnetic fields produced by the application of the said stress in the form of impedance variations, and utilizing said impedance variations to directly indicate said characteristic.

2. Apparatus for ascertaining a characteristic of a shaft-like member subjected to a torsional stress producing both tensile and compressive components of stress therein, comprising means for generating a first magnetic field of cyclically varying intensity, means for generating a second magnetic field of cyclically varying intensity of equal frequency to said first magnetic field, means for positioning each of said field generating means adjacent a surface portion of the said member so that said magnetic fields each produce a flux penetration into said member through said surface portion, said last mentioned means being further arranged to orient the paths of said flux penetrations respectively in substantial alignment with the tensile and compressive components of the said stress applied to said member, and impedance measuring means for indicating variations in said fields produced by variations in the stress applied to said member.

3. The method of ascertaining a torsional stress characteristics of a shaft-like magnetic member subject to a stress producing both tensile and compressive components of stress therein, comprising producing a pair of magnetic fields, locating said fields adjacent a surface portion of said member so that a flux penetration into said surface portion is produced by each magnetic field, further positioning said magnetic fields to substantially align the paths of said flux penetrations through said member respectively with the tensile and compressive components of stress in the member, and differentially detecting the variations in said magnetic fields produced by the application of said stress to the member.

4. The method of ascertaining a stress characteristic of a member having surface portion thereof subjected to greater stress than an interior portion thereof, at least said surface portion having properties such that its effect upon the impedance of an element, when disposed in a magnetic field produced by the application to such element of an alternating potential, depends upon the degree to which said surface portion is stressed, which comprises disposing at least said surface portion in the field of said element, applying to said element an alternating potential having a frequency above the audible range, associating sufficient capacity with said element to produce a tuned circuit approximately resonant to the frequency of said alternating potential, and utilizing the impedance of said element as affected by said surface portion to ascertain said characteristic.

5. The method of ascertaining a stress characteristic of a cylindrical member under torque stress thereby having a surface portion thereof subjected to greater stress than an interior portion thereof, at least said surface portion having properties such that its effect upon the impedance of a coil, when disposed in a magnetic field produced by the application to such coil of an alternating potential, depends upon the degree to which said surface portion is stressed, which comprises disposing at least said surface portion in the field of said coil, applying to said coil an alternating potential having a frequency above 200,000 cycles per second, associating sufficient capacity with said coil to cause the resulting tuned circuit to be approximately resonant to the frequency of said alternating potential, and utilizing the impedance of said coil as affected by said surface portion to ascertain said characteristic.

6. An electrical system for ascertaining a characteristic of a member at least a portion whereof has properties such that its effect upon the impedance of an impedance means, when disposed in a magnetic field produced by the application of a potential to such impedance means, depends upon the degree to which such member is stressed, comprising a source of alternating current energy of a frequency above the audible range, a measuring circuit, response means, means coupling the source and response means to said measuring circuit in such relation that a variation in the impedance of said measuring circuit actuates said response means, said measuring circuit comprising an element having at said frequency a relatively high ratio of reactance to resistance, means comprising a said impedance means adapted to be disposed in cooperative relation to the member so that a magnetic field produced thereby includes at least said portion of the member, a transmission line having at said frequency an impedance which is low in comparison to the impedance of said element, and means coupling said element to said impedance means through said line, the said measuring circuit being tuned to the neighborhood of resonance to said frequency.

7. An electrical system for ascertaining a characteristic of a member at least a portion whereof has properties such that its effect upon the impedance of an impedance means, when disposed in a magnetic field produced by the application of a potential to such impedance means, depends upon the degree to which such member is stressed, said stressing producing angularly displaced tensile and compressive stress components in said member, comprising: a source of alternating current energy of a frequency above the audible range; a pair of circuits; response means; means coupling the source and response means to said pair of circuits in differential network fashion whereby the magnitude of the energy transfer from said source to said response means is approximately proportional to the divergence of the vectorial impedance of said circuits from a predetermined proportionality, each of said circuits comprising elements having at said frequency a relatively high ratio of reactance to resistance, means comprising a said impedance means adapted to be disposed in cooperative relation to the member so that a magnetic field produced thereby includes at least said portion of the member, a transmission line having at said frequency an impedance which is low in comparison to the impedance of said elements, and means coupling said elements to said impedance means through said line, the said circuits each comprising said elements, impedance means, line and coupling means being tuned to the neighborhood of resonance to said frequency, and the said impedance means being respectively oriented relative to the member to predominantly respond to said respective stress components.

8. An electrical system for ascertaining a characteristic of a member at least a portion whereof has properties such that its effect upon the impedance of an impedance means, when disposed in a magnetic field produced by the application of a potential to such impedance means, depends upon the degree to which such member is stressed, said stressing producing angularly displaced tensile and compressive stress components in said member, comprising: a source of alternating current energy of a frequency above the audible range; a pair of circuits; response means; means coupling the source and response means to said pair of circuits in differential network fashion whereby the magnitude of the energy transfer from said source to said response means is approximately proportional to the divergence of the vectorial impedances of said circuits from a predetermined proportionality, each of said circuits comprising elements having at said frequency a relatively high ratio of reactance to resistance, means comprising a said impedance means adapted to be disposed in cooperative relation to the member so that a magnetic field produced thereby includes at least said portion of the member, a transmission line having at said frequency an impedance which is low in comparison to the impedance of said elements, and means coupling said elements to said impedance means through said line, the said circuits each comprising said elements, impedance means, line and coupling means being tuned to the neighborhood of resonance to said frequency, and the said impedance means being respectively oriented relative to the member so that the directions of the fields thereof are substantially parallel to the respective said tensile and compressive components.

9. The method of ascertaining a characteristic of a member, which comprises providing said member with a surface layer having properties such that its effect upon the impedance of an element, when disposed in a magnetic field produced by the application of a potential to such element, depends upon the degree to which such member is stressed, securing the layer to the member so that stresses in the member are accompanied by stresses in the layer, disposing at least a portion of said layer in a said magnetic field, and utilizing the impedance of said element as affected by said member to ascertain said characteristic.

10. The combination with a member, a characteristic whereof is to be ascertained, a body of material having properties such that the reactive effect thereof upon a magnetic field, in which such material is disposed, depends upon the degree to which such member is stressed, said body of material being directly bonded to the member in such relation that stresses applied to the member correspondingly stress the material, and being so constructed and of such mass as to incorporate negligible, additive mechanical characteristics to the member, the characteristics of which are being ascertained.

11. The combination with a member, a characteristic whereof is to be ascertained, a body of material having properties such that the reactive effect thereof upon a magnetic field, in which such material is disposed, depends upon the degree to which such member is stressed, said body of material being bonded to the member in such relation that stresses applied to the member correspondingly stress the material, and said material being so constructed as to form a surface layer which is bonded to the body of the member.

CLARE MORGAN RIFENBERGH.

(References on following page)

REFERENCES CITED

The following references are of record in the file of this patent:

UNITED STATES PATENTS

| Number | Name | Date |
|---|---|---|
| 1,666,680 | Buckley | Apr. 17, 1928 |
| 2,053,560 | Janovsky | Sept. 8, 1936 |
| 2,081,748 | Janovsky | May 25, 1937 |
| 2,269,584 | Eldredge | Jan. 13, 1942 |
| 2,280,226 | Firestone | Apr. 21, 1942 |
| 2,312,888 | Everest | Mar. 2, 1943 |
| 2,337,231 | Cloud | Dec. 21, 1943 |
| 2,365,073 | Haight | Dec. 12, 1944 |
| 2,370,845 | Davis | Mar. 6, 1945 |

FOREIGN PATENTS

| Number | Country | Date |
|---|---|---|
| 442,441 | Great Britain | Feb. 3, 1936 |
| 658,570 | Germany | Apr. 6, 1938 |
| 658,569 | Germany | Apr. 11, 1938 |
| 831,342 | France | June 7, 1938 |
| 49,262 | France | Nov. 12, 1938 |